US005150445A

United States Patent [19]

Toyoda et al.

[11] Patent Number: 5,150,445

[45] Date of Patent: Sep. 22, 1992

[54] LUMINOUS DISPLAY SYSTEM INCORPORATING OPTICAL FIBERS

[75] Inventors: Takashi Toyoda; Masafumi Takesako, both of Sagamihara, Japan

[73] Assignee: Minto Kensetsu Co. Ltd., Kanagawa, Japan

[21] Appl. No.: 598,706

[22] PCT Filed: Jun. 20, 1988

[86] PCT No.: PCT/JP88/00612

§ 371 Date: Oct. 22, 1990

§ 102(e) Date: Oct. 22, 1990

[87] PCT Pub. No.: WO89/10606

PCT Pub. Date: Nov. 2, 1989

[30] Foreign Application Priority Data

Apr. 22, 1988 [JP] Japan .................................. 63-98198

[51] Int. Cl.[5] .................................................. G02B 6/04

[52] U.S. Cl. .................................... 385/116; 385/115; 385/901

[58] Field of Search ............... 350/96.24, 96.25, 96.27; 385/901, 115, 116

[56] References Cited

U.S. PATENT DOCUMENTS 4,279,089 7/1981 Murakami ........................... 385/901
4,299,447 11/1981 Soltan et al. ................. 350/96.25 X
4,601,537 7/1986 Saccocio ...................... 350/96.25 X
4,917,448 4/1990 Oppenheimer ............. 350/96.25 X

FOREIGN PATENT DOCUMENTS 2148570A 5/1985 United Kingdom .

*Primary Examiner*—John D. Lee
*Assistant Examiner*—Stephen W. Barns
*Attorney, Agent, or Firm*—Spencer, Frank & Schneider

[57] ABSTRACT

In a luminous display system incorporating optical fibers, through-holes are formed in a display screen so as to form an equispaced rectangular grid. Each optical fiber is provided with an input and an output terminal. The output terminals are embedded in the through-holes while the input terminals of the optical fbers are attached to an input section. The input section has a rear surface on which an image is projected. Arrangement of the input terminals on the input section is the same as that of the output terminals at the display screen an area of which is equal to or more than that of the input section. A liquid crystal display panel is interposed between the input section rear surface and a light source. The light source projects light through the liquid crystal display panel and a lens, the light then being reflected from a reflecting surface to the rear surface of the input section, so that an enlarged display pattern is formed on the display screen through the optical fibers.

2 Claims, 2 Drawing Sheets

LUMINOUS DISPLAY SYSTEM INCORPORATING OPTICAL FIBERS

FIELD OF THE INVENTION

The present invention relates to a luminous display system provided with a display screen on which an enlarged display image is formed by means of a liquid crystal display (LCD) panel through optical fibers, which liquid crystal panel constitutes a terminal display unit.

DESCRIPTION OF THE PRIOR ART

Hitherto, in a luminous display system, it is well known to transmit a display image and the like through bundles of optical fibers so as to present a luminous display of the image on a screen of the system. In this kind of luminous display system, for example, as shown in FIG. 5, output terminals of the optical fibers 52 are embedded in a display screen 50 through a predetermined number of through-holes which are so formed in a screen board 51 as to correspond in position to dots forming a desired display pattern such as characters and graphic designs; input terminals of the optical fibers 52 are bundled into a suitable number of groups 53*a*, 53*b*, . . . corresponding to the suitable number of portions of the display pattern; and light sources 54*a*, 54*b*, . . . and color filters 55*a*, 55*b*, . . . are provided in the vicinity of the groups 53*a*, 53*b*, . . . of the input terminals of the optical fibers 52 to issue color light to the input terminals of the groups 53*a*, 53*b*, . . . , the color light being transmitted to the screen board 51 through the optical fibers 52 so that the color light provides the luminous display pattern such as desired graphic designs and characters on the screen 50.

As described above, it is possible for the luminous display system incorporating the optical fibers 52 to provide a desired display pattern such as characters and graphic designs on its display screen 50. In addition to this, it is also possible to employ the output terminals of the optical fibers 52 of the above system in place of miniature lamps with which a Xmas tree is decorated, which output terminals of the optical fibers 52 are lighted intermittently in use.

However, the conventional luminous display system incorporating the optical fibers suffers from some disadvantages as follows. Namely, in the conventional luminous display system, since the optical fibers are bundled into a suitable number of groups corresponding to the suitable number of portions of the desired display pattern and each of the groups of the optical fibers requires a light source in the vicinity of the input terminals of the optical fibers of the group, the conventional display system is complex in construction and constitutes a large-sized apparatus requiring a large space in installation. In addition, the conventional luminous display system also suffers from its large electric power consumption caused by many light sources employed in the system, which large electric power consumption results in a large amount of heat which is produced in the system in operation to increase a temperature of the system quite considerably. Consequently, the conventional luminous display system is laborious and costly in its operation and maintenance. Further, in the conventional luminous display system, since the through-holes are formed in the display screen in positions corresponding to dots forming the desired display pattern, it is impossible for the conventional system to move the display pattern or image on the screen. As a result, the user soon tires of such system that presents only one display pattern or image. In the conventional luminous display system, in case that the display pattern is replaced with a new pattern, it is necessary to convert a substantially entire system. However, such entire conversion takes much money. In order to vary the display pattern in color, the conventional luminous display system employs color filters each of which is interposed between the light source and the input terminal of each of the groups of the optical fibers and moved in use to vary the display pattern or image in color. However, the user also soon tires of such fixed pattern even if it varies in color.

SUMMARY OF THE INVENTION

It is an object of the present invention to resolve the disadvantages inherent in the conventional luminous display system incorporating the optical fibers by providing a luminous display system incorporating optical fibers to which a single light source issues a luminous display pattern or image which is presented on a display screen through the optical fibers, which image is easily changeable without converting the system and is useful as continuously moving visual information media.

The above object of the present invention are accomplished by providing:

A luminous display system incorporating optical fibers, comprising:

a display screen in which a plurality of output terminals of the optical fibers are embedded through a plurality of through-holes so as to face forward, the through-holes being formed in the display screen so as to be equally spaced apart from each other in both of a vertical and a horizontal direction;

a focusing section having its rear surface serve as a primary screen, the focusing section being constructed of a bundle of a plurality of input terminals of the optical fibers, arrangement of which input terminals corresponds to that of the output terminals of the optical fibers in a vertical and a horizontal direction, an effective area of the primary screen being equal to or less than that of the display screen; and a liquid crystal display panel serving as a display terminal unit which is controlled/driven by an image driving means of: a television receiver, a video player, or a computer display instrument, the image driving means being brought into close contact with the primary screen;

whereby an image issued from the liquid crystal display panel to the primary screen passes through the optical fibers to reach the display screen on which the image is enlarged to provide a luminous display image thereon.

The liquid crystal display panel of the luminous display system of the present invention may be remotely controlled by the use of a suitable means such as: television receivers, video players, computer display instruments and the like, to make it possible to change the display image in color, pattern, brightness and size, as needs require.

In addition, the luminous display system of the present invention may be electronically interlocked with audio instruments to provide visual interpretation of sounds so as to compose improved image/sound information media.

DESCRIPTION OF THE PREFERRED EMBODIMENTS

Hereinbelow, preferred embodiments of the present invention will be described in detail with reference to the accompanying drawings.

Figure 1:
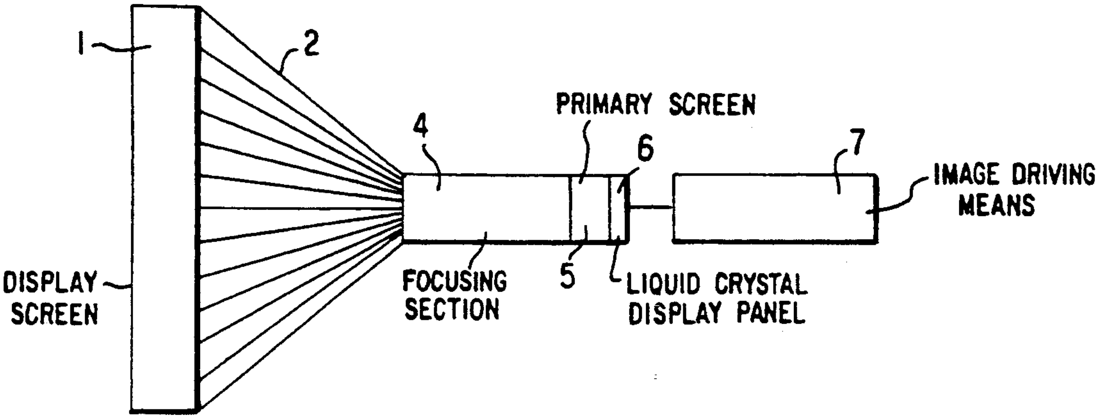
FIG. 1 is a side view of the luminous display system incorporating the optical fibers according to the present invention, illustrating a principle of the present invention.
Figure 2:
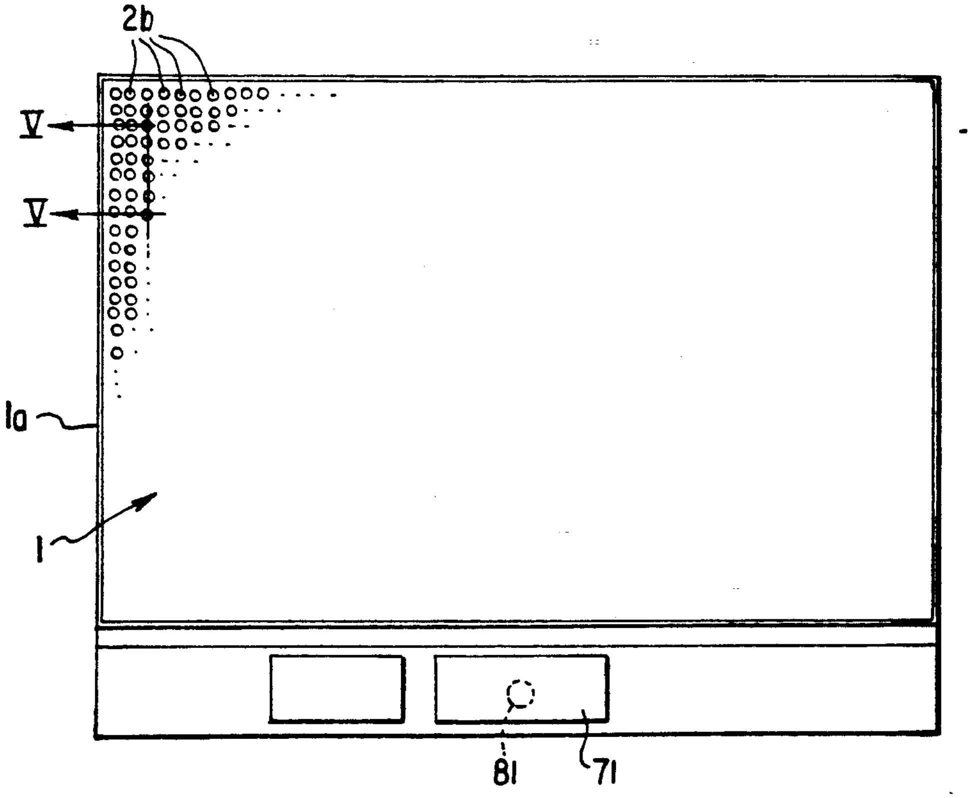
FIG. 2 is a front view of a preferred embodiment of the luminous display system of the present invention shown in FIG. 1.
Figure 3:
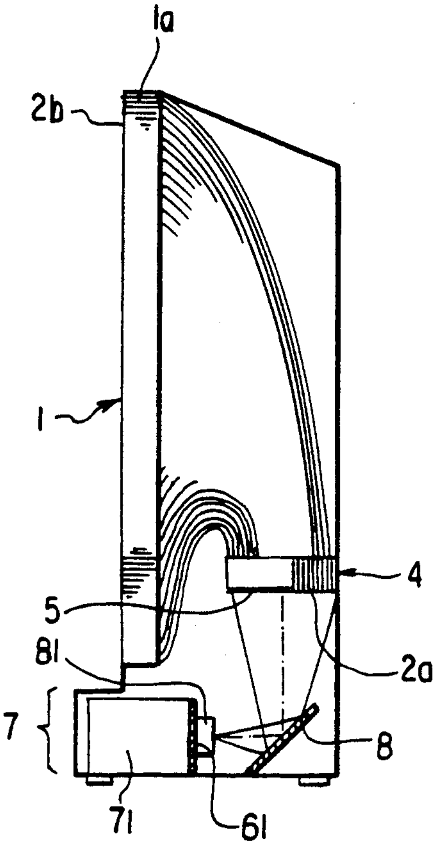
FIG. 3 is a side view of the embodiment of the luminous display system of the present invention shown in FIG. 1.
Figure 4:
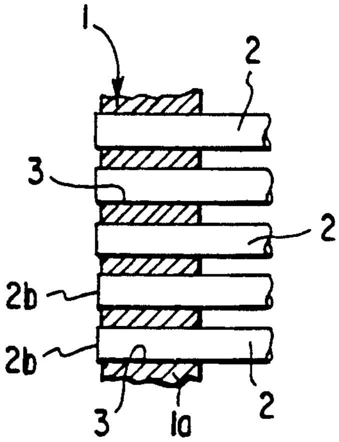
FIG. 4 is an enlarged cross-sectional view of the embodiment of the luminous display system of the present invention shown in FIG. 2, taken along the line V—V of FIG. 2.
Figure 5:
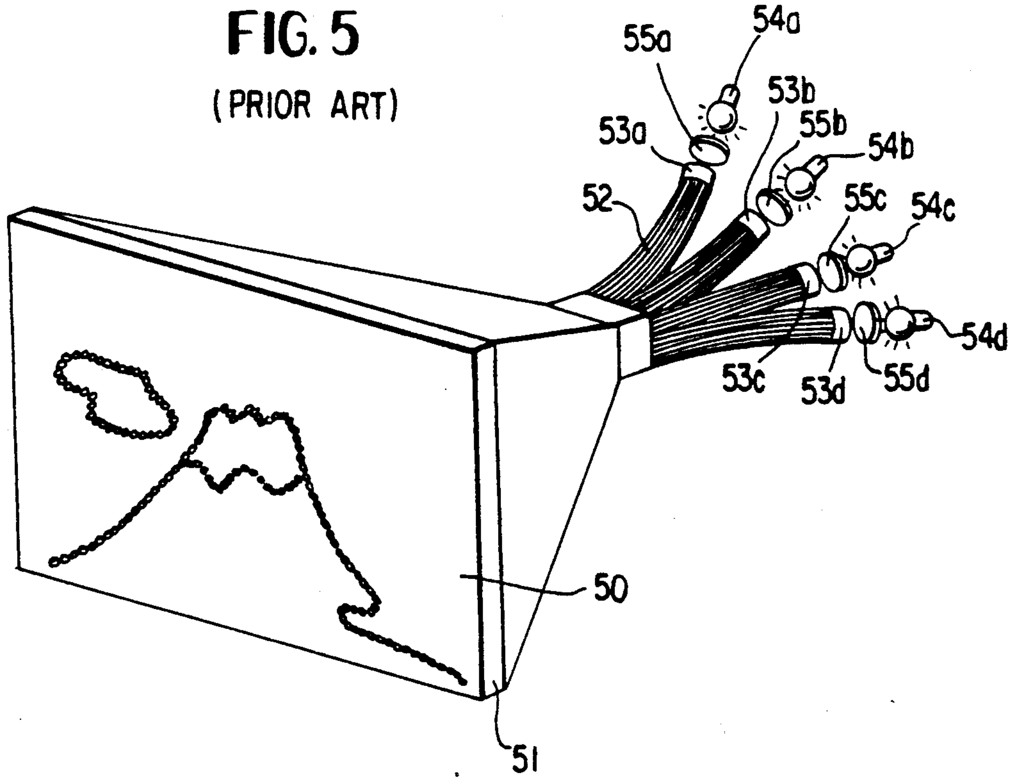
FIG. 5 (PRIOR ART)
FIG. 5 is a perspective view of a conventional luminous display system incorporating the optical fibers.

As shown in FIG. 1, a luminous display system, which incorporates optical fibers 2 according to the present invention, is provided with a display screen 1 provided with a screen display matrix 1*a*. The display matrix 1*a* is made of a suitable material such as plastics and the like, while provided with a plurality of through-holes 3 in which a plurality of optical fibers 2 are fixedly mounted or embedded, respectively. The through-holes 2 of the display matrix 1*a* are equally spaced apart from each other in both of a vertical and a horizontal direction of the display matrix 1*a*. Each of the optical fibers 2 is provided with an input terminal 2*a* and an output terminal 2*b*. Each of the output terminals 2*b* of the optical fibers 2 is fixedly mounted or embedded in each of the through-holes 3 of the display matrix 1*a* to face forward so that each of the output terminals 2*b* constitutes a pixel of the display pattern or image formed on the display screen 1. On the other hand, the input terminals 2*a* of the optical fibers 2 are bundled into a focusing section 4 in which the input terminals 2*a* of the optical fibers 2 correspond in arrangement to the output terminals 2*b* of the optical fibers 2 having been embedded in the display matrix 1*a*. A rearward surface of the focusing section 4 forms a primary screen 5 an area of which is less than that of the display matrix 1*a*, in which primary screen 5 each of the input terminals 2*a* of the optical fibers 2 constitutes a pixel of the display pattern or image formed on the display screen 1. In FIG. 1: the reference 6 denotes a liquid crystal display panel which is driven by an image driving means 7 comprising television receivers, video players, computer display instruments and the like. The liquid crystal display panel 6 is oppositely disposed from the primary screen 5 while brought into close contact therewith. Consequently, the luminous display pattern or image formed on the liquid crystal display panel 6 is transferred to the primary screen 5 on which the display image enters the input terminals 2*a* of the optical fibers 2, which input terminals 2*a* constitute the pixels of the display image, so that the display image passes through the optical fibers 2 and reaches the output terminals 2*b* thereof, whereby an enlarged display image is constructed of the output terminals 2*b* of the optical fibers 2 on the display screen 1, which output terminals 2*b* serve as the pixels of the display image thus enlarged on the display screen 1. In the embodiment shown in FIGS. 2 to 4, the image driving means 7 is disposed below the display screen 1 and is constructed of a liquid crystal display 61 and driving unit 71 and is further provided with a lens 81 and a circuit for projecting a reverse image of the liquid crystal display image. Reflective surface 8 reflects the display image onto the rear surface of primary screen 5.

As described above, as for the optical fibers 2 employed in the luminous display system of the present invention, there is no difference in arrangement between the input terminals 2*a* arranged in the primary screen 5 and the output terminals 2*b* arranged in the display matrix 1*a* with the exception of their occupying areas, i.e., display areas. Consequently, the moving display image such as characters and graphic patterns enlarged on the display screen 1 is geometrically similar to that formed on the liquid crystal display panel 6 which serves as a light source of the system.

As described above, in contrast with the conventional luminous display system in which the optical fibers are bundled into a plurality of groups corresponding to portions of the display pattern and the light source is provided in each of the groups to face the input terminals of the optical fibers of each of the groups so that the display image is fixed in shape, the luminous display system of the present invention employs the liquid crystal display panel serving as an image terminal unit which is driven by the image driving means such as the television receivers, video players and the computer display terminal instruments to make it possible to provide a large-sized moving display image. Image enlarging mechanism of the luminous display system of the present invention is quite simple as described above, and, therefore, the luminous display system is not expensive and easily operated. In addition, the display system of the present invention is easy in maintenance. Consequently, economical effect of the present invention is large. In combination with various image projector instruments and audio instruments, the luminous display system of the present invention can provide various display images.

As is clear from the above description, the luminous display system incorporating the optical fibers according to the present invention is useful as: an advertising tower; a traffic control sign board; and an interior decoration panel employed in walls, partitions, ceilings and the like. In addition, the luminous display system of the present invention finds wide application in various luminous display industries.

We claim:

1. A luminous display system incorporating optical fibers, comprising:

a display screen in which a plurality of output terminals of said optical fibers are embedded in and extend through a plurality of through-holes so as to face forward, said through-holes being formed in said display screen so as to be equally spaced apart from each other in both a vertical and a horizontal direction;

a focusing section having its rear surface serving as a primary screen, said focusing section being constructed of a bundle of a plurality of input terminals of said optical fibers, with the arrangement of said input terminals of said optical fibers corresponding to that of said output terminals of said optical fibers in both a vertical and a horizontal direction, and with an effective area of said primary screen being equal to or less than that of said display screen;

a liquid crystal display panel serving as a display terminal unit which is controlled/driven by an image driving means of a television receiver, a video player, or a computer display instrument to produce an image; and means for projecting an image produced on said liquid crystal display panel onto said primary screen including a lens disposed to focus the image produced by said liquid crystal display panel and a reflective surface disposed between said lens and said primary screen to reflect the image produced by said liquid crystal display panel onto said primary screen whereby an image issued from said liquid crystal display panel to said primary screen passes through said optical fibers to reach said display screen on which the image is enlarged to provide a luminous display image thereon.

2. The luminous display system of claim 1 wherein said display screen is vertically oriented; said primary screen is horizontally oriented and facing in a downward direction; said liquid crystal display panel is vertically oriented; and said liquid crystal display panel and said image projecting means are disposed below said display screen and said primary screen, respectively.

* * * * *